United States Patent [19]

Masse et al.

[11] Patent Number: 5,360,875

[45] Date of Patent: Nov. 1, 1994

[54] METHOD FOR PRODUCING COUPLED ASYMMETRIC POLYMERS

[75] Inventors: Michael A. Masse, Richmond; Steven S. Chin; Craig A. Stevens, both of Houston, all of Tex.

[73] Assignee: Shell Oil Company, Houston, Tex.

[21] Appl. No.: 120,116

[22] Filed: Sep. 10, 1993

[51] Int. Cl.$^5$ ............................................. C08F 297/04
[52] U.S. Cl. ..................................... 525/314; 525/250; 525/271
[58] Field of Search ................. 525/314, 250, 271

[56] References Cited

U.S. PATENT DOCUMENTS

| | | | |
|---|---|---|---|
| 3,639,517 | 2/1972 | Kitchen et al. | 525/314 |
| 3,939,112 | 2/1976 | Needham | 524/467 |
| 4,080,407 | 3/1978 | Fodor | 525/314 |
| 4,086,298 | 4/1978 | Fahrbach et al. | 525/314 |
| 4,091,053 | 5/1978 | Kitchen | 525/314 |
| 4,167,545 | 9/1979 | Fahrbach et al. | 525/122 |
| 4,180,530 | 12/1979 | Bi et al. | 525/98 |
| 4,221,884 | 9/1980 | Bi et al. | 525/314 |
| 4,248,981 | 2/1981 | Milkovich et al. | 525/271 |
| 4,248,982 | 2/1981 | Bi et al. | 525/314 |
| 4,248,983 | 2/1981 | Bi et al. | 525/314 |
| 4,248,984 | 2/1981 | Bi et al. | 525/314 |
| 4,390,663 | 6/1983 | Nicholson | 525/53 |
| 4,391,949 | 7/1983 | St. Clair | 525/99 |
| 4,600,736 | 7/1986 | Needham | 523/351 |
| 4,720,514 | 1/1988 | Needham | 523/351 |
| 4,788,232 | 11/1988 | Needham | 523/351 |
| 4,835,220 | 5/1989 | Bronstert et al. | 525/250 |
| 4,925,899 | 5/1990 | Rendina et al. | 525/314 |

FOREIGN PATENT DOCUMENTS 0316671 11/1988 European Pat. Off. .

Primary Examiner—James J. Seidleck
Assistant Examiner—M. L. Warzel
Attorney, Agent, or Firm—Donald F. Haas

[57] ABSTRACT

A process for preparing a coupled asymmetric block copolymer of a vinyl aromatic hydrocarbon and a conjugated diene which comprises:

(a) adding sufficient anionic polymerization initiator to the vinyl aromatic hydrocarbon monomer to start polymerization of the vinyl aromatic hydrocarbon, (b) polymerizing the vinyl aromatic hydrocarbon for a time sufficient to form a first set of vinyl aromatic hydrocarbon blocks having a desired molecular weight, (c) adding sufficient anionic polymerization initiator to start polymerization of a second set of vinyl aromatic hydrocarbon blocks, (d) completing the polymerization of the vinyl aromatic hydrocarbon for a time such that the first set of vinyl aromatic hydrocarbon blocks continues to grow to the desired molecular weight and the second set of vinyl aromatic hydrocarbon blocks grows to a desired smaller molecular weight, (e) adding a conjugated diene and polymerizing it on the ends of the vinyl aromatic hydrocarbon blocks for a time sufficient to form vinyl aromatic hydrocarbon-conjugated diene arms of the desired molecular weight, and (f) adding a coupling agent and coupling the arms to form the asymmetric block copolymer.

5 Claims, No Drawings

METHOD FOR PRODUCING COUPLED ASYMMETRIC POLYMERS

BACKGROUND OF THE INVENTION

The present invention relates to a method for producing asymmetric polymers. More particularly, this invention relates to a method for producing asymmetric polymers having vinyl aromatic hydrocarbon-conjugated diene copolymer arms wherein the vinyl aromatic hydrocarbon blocks of a controlled portion of the arms differ in molecular weight.

Heretofore, several methods have been proposed for preparing asymmetric radial polymers. As is well known in the prior art, linear coupled polymers are comprised of two arms coupled in the center by a coupling agent and radial polymers comprise three or more arms extending outwardly from a coupling agent nucleus. The known asymmetric polymers contain arms of at least two different polymers, which polymers may vary as to chemical composition, structure and/or molecular weight. A principle difference in the methods frequently used to prepare asymmetric polymers resides in the selection of a coupling agent which forms the center or nucleus of the polymer. Multifunctional coupling agents such as silicon tetrachloride have been used to form asymmetric radial polymers having three or four arms. Star-shaped radial polymers having many more arms have been formed using a poly alkenyl aromatic compound, such as divinyl benzene, as the coupling agent as described in Canadian Patent 716,645 and U.S. Pat. No. 3,985,830. Linear coupled polymers are formed using difunctional coupling agents such as dibromoethane.

Heretofore, linear coupled polymers were made by coupling two identical block copolymer arms, A–B (where A is a vinyl aromatic hydrocarbon and B is a conjugated diene) to form a symmetrical triblock polymer, A–B–A. Generally, asymmetric radial polymers referred to in the prior art are asymmetric in the sense that there are at least two different types of arms, one of which is an A-B arm and the other is either a B or an A arm, i.e., homopolymer polydiene or homopolymer poly vinyl aromatic hydrocarbon. The present invention provides a method for making asymmetric polymers which have at least two sets of A–B block copolymer arms wherein the A blocks of the block copolymer arms have differing molecular weights. Such polymers have the advantage of having a relatively high styrene content while at the same time maintaining a soft, tacky character. Further, the A blocks of differing molecular weight are made in a single reactor. Therefore, the process of the present invention also has the advantage of requiring a reduced amount of process equipment.

SUMMARY OF THE INVENTION

A process is provided herein for preparing a coupled asymmetric block copolymer of a vinyl aromatic hydrocarbon and a conjugated diene. The first step is adding sufficient anionic polymerization initiator to a vinyl aromatic hydrocarbon monomer to start polymerization of that monomer. The second step is then to polymerize the vinyl aromatic hydrocarbon for a time sufficient to form a first set of vinyl aromatic hydrocarbon blocks having a desired molecular weight. Next, sufficient anionic polymerization initiator is added to start polymerization of a second set of vinyl aromatic hydrocarbon blocks. The polymerization of the vinyl aromatic hydrocarbon is completed in that the first set of block copolymer arms continues to grow as does the second set. This is carried out for a time such that the first set of blocks continues to grow to the desired molecular weight and the second set of blocks grows to a desired smaller molecular weight. Next, a conjugated diene is added and polymerized on the ends of the vinyl aromatic hydrocarbon blocks for a time sufficient to form vinyl aromatic hydrocarbon-conjugated diene block copolymer arms of the desired molecular weight. The final step is adding a coupling agent and coupling the arms to form the asymmetric block copolymer.

The asymmetric block copolymer will be linear if a difunctional coupling agent such as dibromoethane is used. The asymmetric block copolymer will be a four-armed radial block copolymer if a tetrafunctional coupling agent such as silicon tetrachloride is used. The asymmetric block copolymer will be a star block copolymer if divinylbenzene or some other coupling monomer is used as the coupling agent. The preferred vinyl aromatic hydrocarbon is styrene and the preferred conjugated dienes are butadiene and isoprene.

DESCRIPTION OF THE INVENTION

The block copolymers of the present invention have an idealized structure as follows:

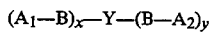

$$(A_1-B)_x-Y-(B-A_2)_y$$

The subscripts x and y range from 1 to 40. The A blocks are polymer blocks of a vinyl aromatic hydrocarbon. $A_1$ and $A_2$ are blocks of different molecular weights. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The B blocks are polymer blocks of conjugated dienes. Preferred dienes include butadiene and isoprene, with isoprene being much preferred. Other dienes may also be used, including piperylene, methylpentyldiene, phenylbutadiene, 3,4-dimethyl-1,3-hexadiene, 4,5-diethyl1,3-octadiene and the like, preferably those conjugated dienes containing 4 to 8 carbon atoms. Mixtures of conjugated dienes may also be employed.

The Y moiety stands for the multifunctional coupling agent or coupling monomers or initiators used herein. There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972; 3,135,716; 3,078,254, and 3,594,452, the disclosures of which are herein incorporated by reference. The coupling agent of the present invention may be $X_3Si-(CH_2)_n-SiX_3$ where $n \geq 0$ and X is halogen or alkoxy, including bis-trimethoxy-silylethane, hexachlorodisiloxane, bis-trichlorosilylethane, 1,6-bis(trichlorosilyl)-hexane, and hexachlorotriphosphazine to make 6 armed polymer blends, and octachlorotrisiloxane, $Cl_3Si-(CH_2)_n-SiCl_2-(CH_2)_n-SiCl_3$, where $n \geq 0$, to make 8 armed polymer blends.

A much preferred coupling agent is a polyalkenyl aromatic coupling agent. The most preferred coupling agent is divinyl benzene because of its high efficiency in coupling to high arm number. Polyalkenyl aromatic coupling agents capable of forming star shaped polymers are known in the art. See generally, Canadian patent number 716,645 and U.S. Pat. Nos. 4,010,226 and 3,985,830 which are herein incorporated by reference. A detailed description of a variety of such coupling agents is found in U.S. Pat. No. 4,391,949 which is herein incorporated by reference. Examples of suitable polyvinyl aromatic compounds are 1,2-divinyl benzene, 1,3-divinylbenzene, 1,4-divinylbenzene, 1,2,4-trivinylbenzene, 1,3-divinylnaphthalene, 1,8-divinylnaphthalene, 1,3,5trivinylnaphthalene, 2,4-divinylbiphenyl, 3,5,4'-trivinylbiphenyl, 1,2-divinyl-3, 4-dimethylbenzene, 1,5,6-trivinyl-3,7-diethylnaphthalene, 1,3-divinyl-4, 5,6-tributyl naphthalene, 2,2'-divinyl-4-ethyl-4'-propylbiphenyl and the like. Divinyl aromatic hydrocarbons containing up to 26 carbon atoms per molecule are preferred for employment according to this invention. As stated above, particularly preferred is divinylbenzene in either its ortho, meta or para isomer and commercial divinylbenzene which is a mixture of said isomers is also quite satisfactory.

In general, the method of this invention may be used to prepare asymmetric polymers with any polymer containing a reactive end group which will react with one or more functional groups contained in the selected coupling agent. The method is particularly suitable for the preparation of asymmetric polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric polymer of this invention may be prepared by contacting the monomer or monomers with an organoalkali metal compound in a suitable solvent at a temperature within the range from $-150°$ C. to $300°$ C., preferably at a temperature within the range from $0°$ C. to $100°$ C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

In general, the block copolymer is useful as arms in the method of the present invention will have a GPC peak molecular weight within the range of 25,000 to 250,000. The polyvinyl aromatic hydrocarbon content of these polymers generally will range from 3 percent to 30 percent by weight. The molecular weight of the longer polyvinylaromatic hydrocarbon blocks will generally range from 5,000 to 25,000 and the molecular weights of the smaller polyvinyl aromatic hydrocarbon blocks will generally range from 1,000 to 15,000.

Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. The "peak" molecular weight is nearly the same as the weight average molecular weight of the linear polymer or arm. Frequently, two or more peaks will be observed for unassembled asymmetric stars. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The light scattering method may also have to be used to characterize the molecular weight of the unassembled arms, if the arm molecular weight distribution is broad. The following references are herein incorporated by reference:

1. *Modern Size-Exclusion Chromatography*, M. W. Yau, J. J. Kirkland, D. D. Bly, John Wiley & Sons, New York, N.Y., 1979.

2. *Light Scattering from Polymer Solutions*, M. B. Huglin, ed., Academic Press, New York, N.Y. 1972.

3. W. Kay and A. J. Havlik, *Applied Optics*, 12, 541 (1973).

4. M. L. McConnell, *American Laboratory*, 63, May, 1978.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A-B-Li. It is at this point that the living polymer is coupled.

In general, the living polymers used as arms in the asymmetric polymer will be contacted with the coupling agent at a temperature within the range from 0° C. to 100° C. at a pressure within the range from 0 bar to 7 bar and the contacting will be maintained until reaction between the arms and the coupling agent is complete or at least substantially completed, generally for a period of time within the range from 1 to 180 minutes. While the inventors do not wish to be bound by an particular theory, it is believed that the method of this invention results in an improved relative arm distribution because the reactivity of the functional groups contained in the coupling agent stays relatively high as the number of functional groups contained in the coupling agent is reduced as the result of reaction with the metal-carbon bond contained in the living polymer. This allows the coupling reaction to take place quickly.

In general, the polymers useful as arms in the asymmetric polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric polymers of this invention will contain a single terminal reactive group, the polymers used in preparation of the asymmetric polymers will be retained in solution after preparation without deactivating the reactive (living) site. In general, the coupling agents may be added to a solution of the polymer or a solution of the polymer may be added to the coupling agent.

Following the coupling reaction or when the desired coupling efficiency has been obtained, the product is neutralized such as by the addition of terminators, e.g., hydrogen, water, alcohol or other reagents, for the purpose of removing the lithium radical forming the nucleus for the condensed polymer product. The product is then recovered such as by coagulation utilizing hot water or steam or both.

For convenience, hereinafter the vinyl aromatic hydrocarbon monomers will be referred to as styrene and the polyvinyl aromatic hydrocarbon blocks will be referred to as polystyrene blocks.

The first step is adding sufficient anionic polymerization initiator to the styrene monomer to start polymerization thereof. In general, from 5 percent to 95 percent of the initiator is required. The polymerization of the styrene monomer is carried out for a time sufficient to form a first set of styrene blocks having a desired molecular weight. The time to achieve the desired molecular weight is calculated with knowledge of the reactant concentrations, the reaction temperature, and some estimate of the rate at which the reactants are consumed.

In general, the rate of consumption of monomer is determined by conducting experiments which measure the concentration of residual monomer as a function of time for various conditions of solvent type, monomer concentration, initiator concentration, and temperature. Alternately, in the case of living polymerizations, the reaction rate may be determined by measuring the increase in polymer product molecular weight with time for the same conditions mentioned above. With knowledge derived by such efforts, one can estimate the molecular weight and the amount of monomer consumed for a particular time at specified, but not necessarily constant, reaction conditions. Conversely, the time required to form a polymer of a specific weight and consumption of a specific fraction of the monomer can the estimated with knowledge of the reaction rate and conditions.

After completion of the foregoing steps, the reaction mixture contains living polystyrene blocks of the desired molecular weight and styrene monomer. At this point, additional initiator is added in an amount sufficient to start the polymerization of a second set of polystyrene blocks. Meanwhile, the polymerization of the first set of polystyrene blocks continues. This step is carried out until complete consumption of the styrene monomer occurs. At complete consumption of the styrene monomer, there exists living polystyrene blocks of the distinct molecular weights. The final molecular weight of the larger blocks should be equal to the sum of their molecular weight after the initial polymerization and the molecular weight of the smaller blocks.

At this point, the reaction mixture contains two sets of living polystyrene blocks with different molecular weights. All of the styrene monomer should have been reacted. Then the diene monomer is added to the reaction mixture and polymerization of it on the ends of the living polystyrene blocks is carried out until the diene blocks achieve their desired molecular weight, preferably when all of the diene has been reacted.

At this point, the reaction mixture contains two sets of living polystyrene-polydiene block copolymer arms. The two sets have identical diene block molecular weights but different styrene block molecular weights. A coupling agent is added to this mixture and the arms are coupled to form the desired asymmetric block copolymer. The conditions of coupling will vary depending upon whether the desired polymer is linear, radial or star and also upon the coupling agent used as heretofore described.

The polymers produced by this process are characterized in that they have polystyrene-polydiene block copolymer arms wherein the polystyrene block molecular weights of some of the arms is greater than that of others. The coupling process will produce a statistical distribution of the arms. In other words, some of the polymers will have all arms of one type and others will have one of one type and x of another type, etc. The overall statistical distribution will be equivalent to a block copolymer which contains the differing arms in the ratios in which the arms were grown in the early steps of the process. These polymers are useful as soft, tacky adhesives which may be cured to their final state by a variety of means including but not limited to chemical vulcanization and radiation crosslinking.

EXAMPLES

Ten asymmetric star block copolymers were made according to the process of the present invention. The molecular weights of the longer polystyrene blocks (MW long) created herein ranged from 7,000 to 21,000. The molecular weights of the shorter polystyrene blocks (MW short) ranged from 2,000 to 10,000. $\times$ is the number fraction of long styrene arms as opposed to short styrene arms desired in the polymer and is also the molar fraction of the total amount of initiator used in the process which is to be used in the first polystyrene polymerization step to initiate the longer polystyrene blocks. Cyclohexane was added to a nitrogen purged 500 ml glass reactor. Styrene monomer was added and mixed into solution. This solution was then brought to the desired temperature. Once stabilized at the desired temperature, the first aliquot of initiator was added. The initiator was 1.4 molar sec-butyllithium in cyclohexane. At a time specified as $t_1$, the second aliquot of initiator was added. The styrene was allowed to polymerize at least until $t_{end}$. The conditions of the styrene polymerizations are listed in Table I.

At the end of the styrene polymerization, the living styryl lithium was added to a purified solution of isoprene in cyclohexane in a 2000 ml glass reactor. Table II lists the amount of isoprene polymerized for each polymer. The mass of styrene and isoprene amounted to 15 percent of the total mass of the solution. The solution temperature was 60° C. The polymerization of isoprene was conducted at these conditions for 60 minutes. After polymerization of the isoprene the living arms were coupled using purified 55 percent divinyl benzene for 60 minutes at 60° C. 3 moles of divinyl benzene were added for each mole of lithium. Table III lists the molecular description of the polymers so made.

TABLE I

| | Conditions for Styrene Polymerization | | | | | | |
|---|---|---|---|---|---|---|---|
| Polymer | Mass Cyclohexane (g) | Mass Styrene (g) | Temp (°C.) | First S-Buli (ml) | $t_1$ (Min) | Second S-buli (ml) | $t_{end}$ (Min) |
| 1 | 120.9 | 13.4 | 50 | 0.53 | 2.97 | 2.13 | 14.7 |
| 2 | 96.6 | 10.7 | 40 | 0.22 | 1.86 | 0.90 | 36.9 |
| 3 | 85.8 | 9.5 | 50 | 0.23 | 7.19 | 0.91 | 22.2 |
| 4 | 279.7 | 31.1 | 50 | 0.48 | 3.46 | 1.93 | 22.3 |
| 5 | 279.7 | 31.1 | 50 | 0.48 | 3.46 | 1.93 | 22.3 |
| 6 | 279.7 | 31.1 | 50 | 0.48 | 3.46 | 1.93 | 22.3 |
| 7 | 85.8 | 9.5 | 50 | 0.57 | 4.55 | 0.57 | 19.5 |
| 8 | 248.3 | 27.6 | 40 | 1.23 | 2.93 | 1.23 | 40.6 |
| 9 | 348.4 | 38.7 | 50 | 1.15 | 10.47 | 1.15 | 31.4 |
| 10 | 188.0 | 20.9 | 50 | 0.53 | 5.34 | 0.53 | 28.3 |

TABLE II

| Amount of Isoprene Monomer Polymerized | |
|---|---|
| Polymer | Mass Isoprene (g) |
| 1 | 186.8 |
| 2 | 189.3 |
| 3 | 190.5 |
| 4 | 168.9 |
| 5 | 168.9 |
| 6 | 168.9 |
| 7 | 190.5 |
| 8 | 172.4 |
| 9 | 161.3 |
| 10 | 179.1 |

TABLE III

| | Molecular Description of Polymers | | | | | | |
|---|---|---|---|---|---|---|---|
| Polymer | MW Long | MW Short | x | Styrene Content (wt %) | MW Isoprene | Arms Coupled to Star (%) | MW Total |
| 1 | 7900 | 3290 | 0.217 | 8.72 | 44900 | 95 | 500000 |
| 2 | 14100 | 7280 | 0.054 | 5.46 | 132500 | 91 | 355000 |
| 3 | 19900 | 2610 | 0.169 | 4.56 | 115900 | 92 | 1150000 |
| 4 | 13900 | 8190 | 0.238 | 17.0 | 46500 | 96 | 450000 |
| 5 | 15200 | 7770 | 0.221 | 15.6 | 51000 | 94 | 770000 |
| 6 | 13200 | 8300 | 0.202 | 16.2 | 47900 | 94 | 950000 |
| 7 | 11800 | 5460 | 0.354 | 4.85 | 151400 | 93 | 820000 |
| 8 | 8190 | 6500 | 0.537 | 14.8 | 42600 | 91 | 740000 |
| 9 | 20700 | 2630 | 0.433 | 20.3 | 41100 | 93 | 860000 |
| 10 | 20300 | 9600 | 0.461 | 21.5 | 53100 | 88 | 950000 |

We claim:

1. A process for preparing a coupled asymmetric block copolymer of the formula

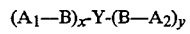

$(A_1-B)_x-Y-(B-A_2)_y$ wherein $A_1$ and $A_2$ are polymer blocks of a vinyl aromatic hydrocarbon having different molecular weights, B is a polymer block of a conjugated diene, Y is a coupling agent and x and y range from 1 to 40 and wherein said copolymer has a vinyl aromatic hydrocarbon content of from 3 to 30 percent by weight which comprises:
   (a) adding sufficient anionic polymerization initiator to the vinyl aromatic hydrocarbon monomer to start polymerization of the vinyl aromatic hydrocarbon, (b) polymerizing the vinyl aromatic hydrocarbon for a time sufficient to form a first set of vinyl aromatic hydrocarbon blocks having a desired molecular weight and leave some unreacted vinyl aromatic hydrocarbon monomer, (c) adding sufficient anionic polymerization initiator to start polymerization of the unreacted monomer from step (b) to form a second set of vinyl aromatic hydrocarbon blocks without the addition of more vinyl aromatic hydrocarbon monomer, (d) completing the polymerization of the vinyl aromatic hydrocarbon for a time such that the first set of vinyl aromatic hydrocarbon blocks continues to grow to a desired peak molecular weight as determined by gel permeation chromatography of from 5000 to 25,000 and the second set of vinyl aromatic hydrocarbon blocks grows to a desired smaller peak molecular weight as determined by gel permeation chromatography of from 1000 to 15,000, (e) adding a conjugated diene and polymerizing it on the ends of the vinyl aromatic hydrocarbon blocks for a time sufficient to form vinyl aromatic hydrocarbon-conjugated diene arms of the desired molecular weight, and (f) adding a coupling agent and coupling the arms to form the asymmetric block copolymer.

2. The process of claim 1 wherein the vinyl aromatic hydrocarbon is styrene and the conjugated diene is selected from the group consisting of butadiene and isoprene.

3. The process of claim 1 wherein the asymmetric block copolymers are asymmetric radial block copolymers.

4. The process of claim 1 wherein the asymmetric block copolymers are asymmetric star block copolymers.

5. The process of claim 1 wherein the asymmetric block copolymers are asymmetric linear block copolymers.

* * * * *